United States Patent [19]
Hayden et al.

[11] Patent Number: 5,935,675
[45] Date of Patent: Aug. 10, 1999

[54] STAGE SYSTEM

[75] Inventors: Michael R. Hayden, Edina; Glynn Neumann, Burnsville, both of Minn.

[73] Assignee: Staging Concepts, Inc., Minneapolis, Minn.

[21] Appl. No.: 08/954,573

[22] Filed: Oct. 20, 1997

[51] Int. Cl.$^6$ ........................................... B32B 1/06
[52] U.S. Cl. ........................... 428/71; 428/76; 428/317.1; 52/309.3; 52/309.8; 52/309.14
[58] Field of Search ............................ 428/71, 76, 317.1; 52/309.3, 309.8, 309.14

*Primary Examiner*—Alexander Thomas
*Attorney, Agent, or Firm*—Hugh D. Jaeger

[57] ABSTRACT

Stage system having lightweight and interchangeable support framework members and components at various levels which support lightweight high strength platform panels of composite construction having a composite wood and high density foam core surrounded by a bottom pan and a top pan. The bottom pan and top pan engage each other as a closed container to completely surround and enclose the composite wood and high density foam core.

1 Claim, 12 Drawing Sheets

STAGE SYSTEM

CROSS REFERENCES TO CO-PENDING APPLICATIONS

None.

BACKGROUND OF THE INVENTION

1. Field of the Invention

The present invention pertains to portable staging equipment, and more particularly, pertains to a lightweight and portable support framework system for support of high strength and lightweight composite construction platform panels used to form the planar surface areas of a portable stage.

2. Description of the Prior Art

Prior art stage systems often included a large variety of components constructed without regard to weight and/or component commonality, and which also required components which were not readily aligned in the field. Prior art platform devices used for upper portable staging have often been of solid construction, thereby being heavy and weighty items which, due to the combination of size and weight, have been cumbersome and unwieldy for manual placement on a portable stage framework. Platform devices which were built of wood or other media having insufficient thickness would often have a spongy feel when walked upon and would not adequately support stage equipment such as larger and heavier musical instruments or other entertainment schemes. The environment in which the platform panel was used was also of concern. Often, stages were set up outside and left in place for days on end only to weather the elements such as rain, heat, cold, dampness, dryness and the like. Environmental changes would often cause warpage and other degradation of the platform panel or even cause laminate separation or rotting, such as in the case of a plywood-like member. After lengthy usage and re-installation, the platform panels would become worn and battered, thus rendering them unfit for proper and future serviceable use. Clearly what is needed is a support system and a platform member which is strong, lightweight, and durable with respect to the elements and handling by stage crew members.

The present invention provides a durable high strength and lightweight platform panel and support members which overcome the problems associated with the prior art devices.

SUMMARY OF THE INVENTION

The present invention relates to a portable support system having a platform panel that is placed on the portable support system which is of composite construction, which is sealed between a top and a bottom steel pan to keep the elements from degrading the structural members contained therein. The platform panel is also of lightweight and high strength construction.

According to one embodiment of the present invention, there is provided a lightweight and portable support framework for a stage system in which is provided platform panels, a matrix of readily assembled support legs, diagonal and horizontal bracing, struts, support plates and brackets which can be configured for various levels and arrangements of staging.

According to another embodiment of the present invention, there is provided a platform panel having mating top and bottom pans which sealingly engage each other over and about layers of high density foam core, wood, and adhesive layers which bind the wood and the high density foam core to each other and to interior surfaces of the top and bottom pans.

One significant aspect and feature of the present invention is a support framework which includes a minimum of configured brackets, braces and other components and which is readily assembled and which includes lightweight component members.

Another significant aspect and feature of the present invention is a platform panel which is lightweight and of high strength construction.

Another significant aspect and feature of the present invention is a construction which is durable with respect to the environment and environmental changes.

Another significant aspect and feature of the present invention is the use of mating top and bottom pans of steel or other such suitable sturdy material in the formation of the platform panels.

Another significant aspect and feature of the present invention is a platform panel having an interior composition of a high density foam core, wood and adhesive.

Another significant aspect and feature of the present invention is an interior composition in which the component members are bonded by adhesive to each other and also to inner surfaces of top and bottom surrounding steel pans.

Having thus described significant aspects and features of the present invention, it is the principal object hereof to provide a platform panel and lightweight support framework for use with a staging system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
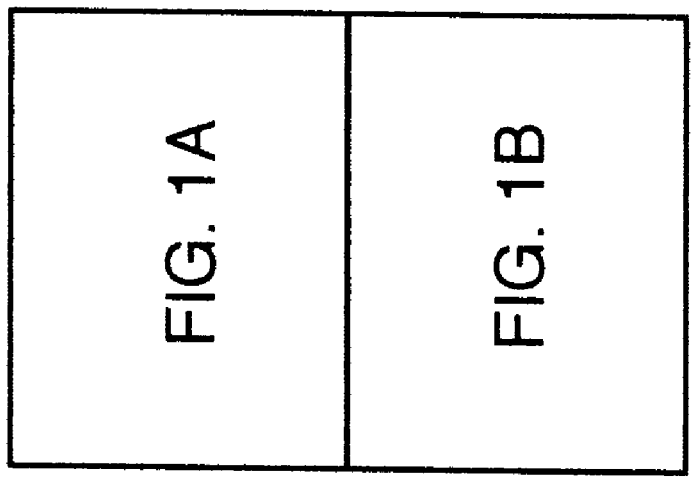
FIG. 1 illustrates a perspective view of a stage system, the present invention, in various stages of assembly.
Figure 1A:
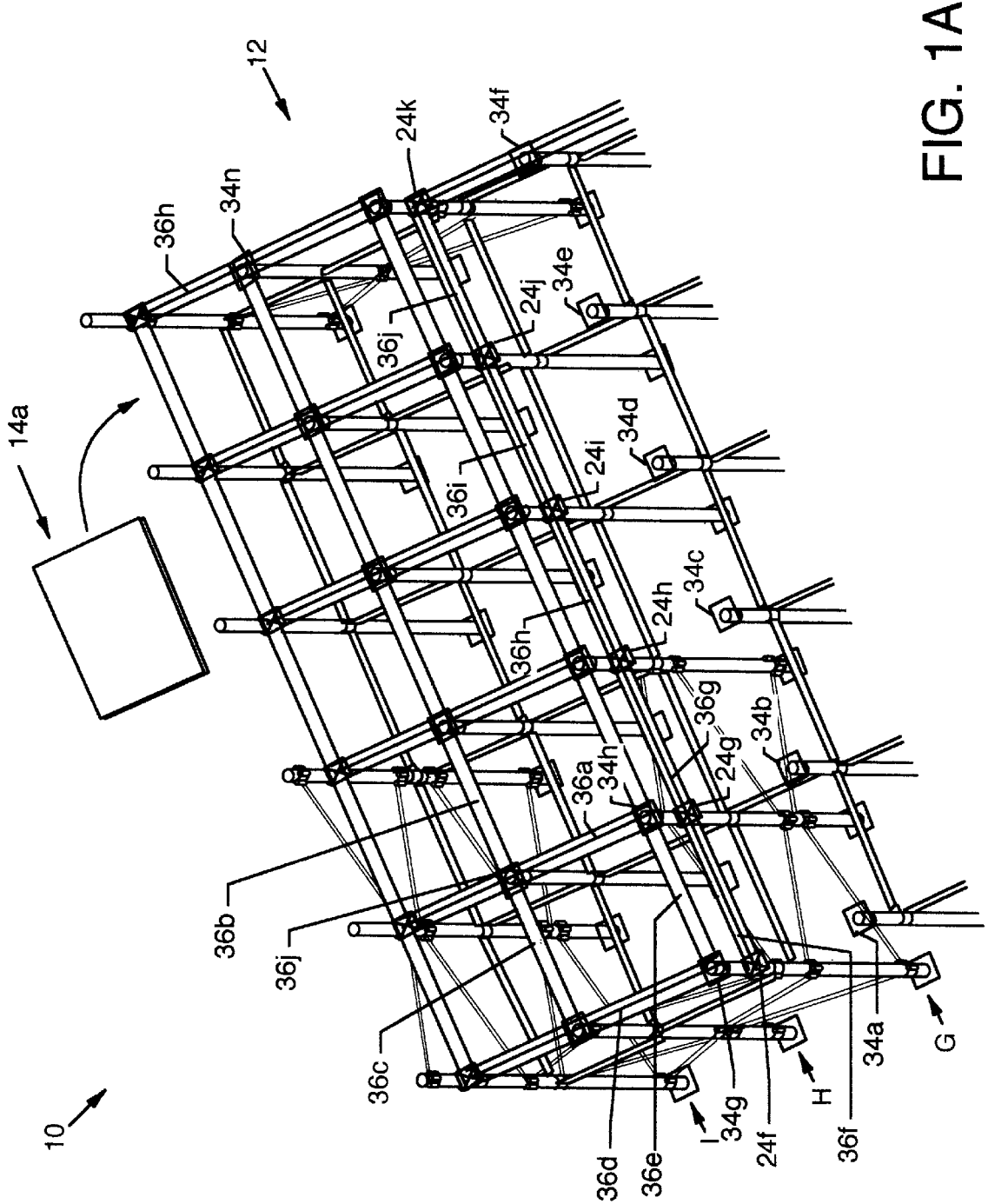
Figure 1B:
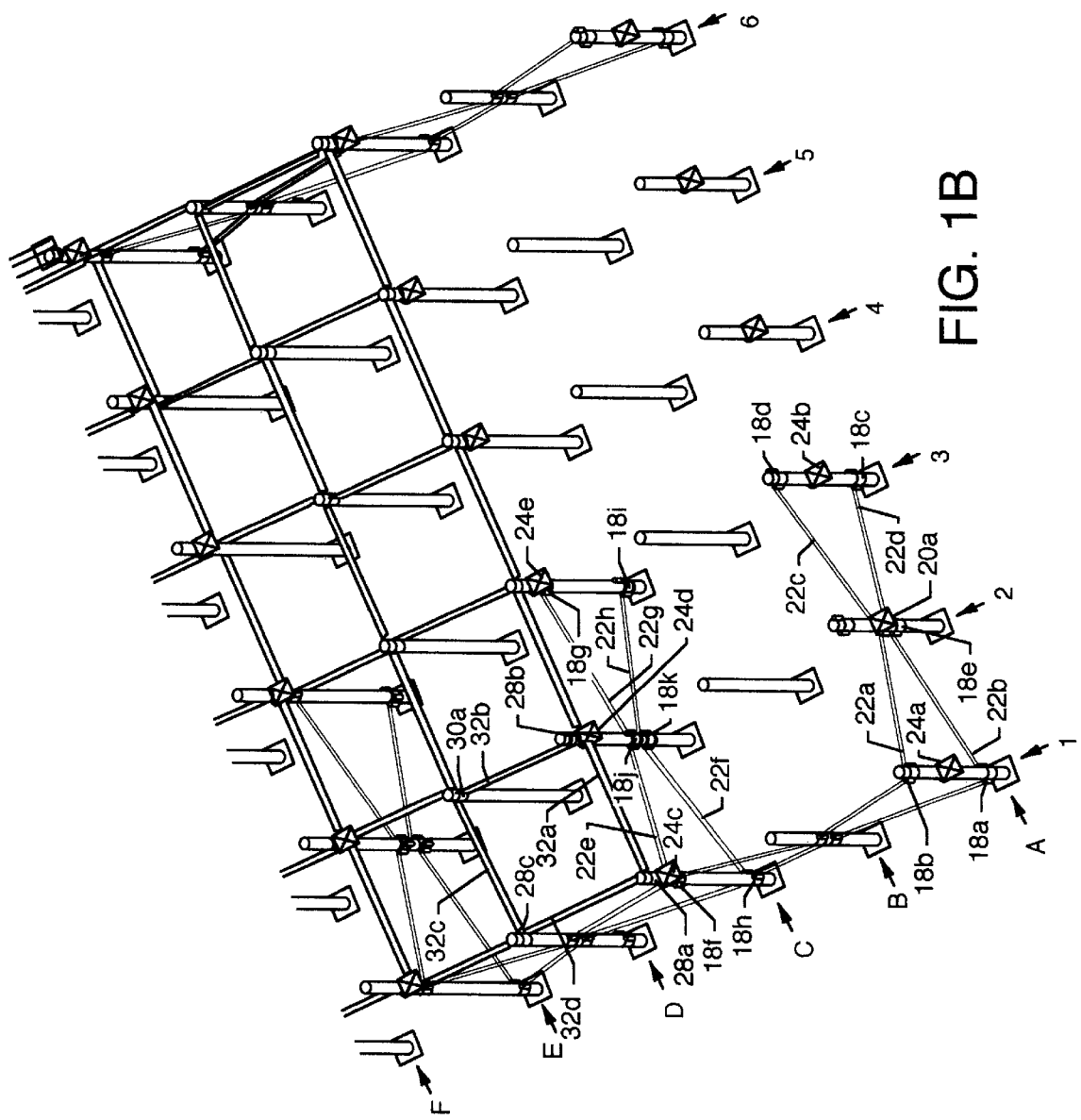

FIG. 1 illustrates a perspective view of a stage system 10, the present invention, in various stages of assembly, including a support framework 12 and a plurality of platform panels 14a through 14n of which panel 14a only is illustrated for purposes of brevity and clarity. The support framework 12 includes a plurality of support legs aligned and identified in a row and column matrix including columns 1–6 and rows A–I. The support legs are of various heights for support of intermediate support structure and horizontally aligned struts at the upper ends of the support legs in columns 1–6 and rows A–I to provide support at various levels for a plurality of panels 14a–14n.

Figure 2:
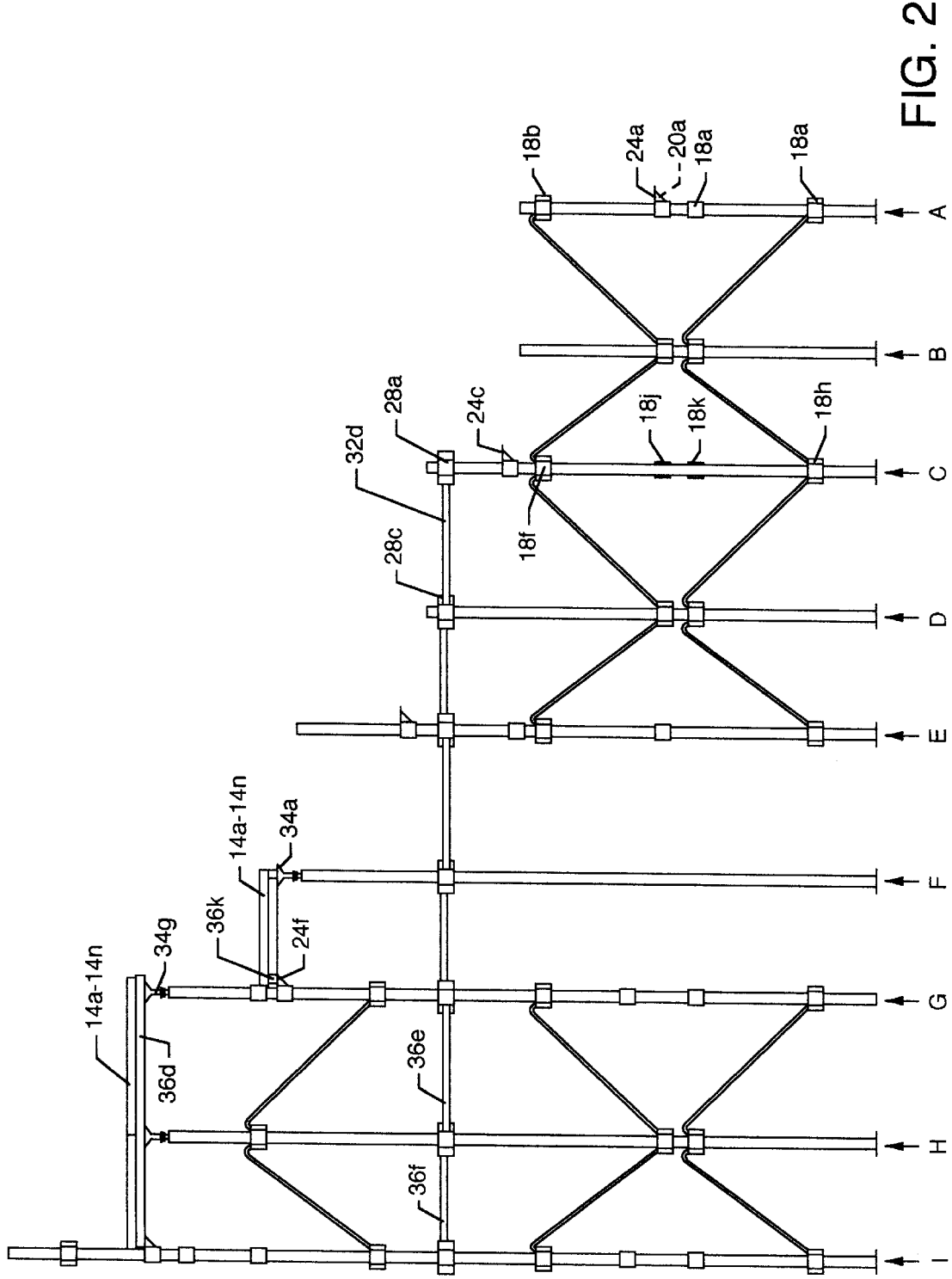
FIG. 2 illustrates a side view of the support framework.

Various support plates and collars, illustrated in detail in FIGS. 4, 5, 6, 7, 8, 9, and other FIGS., and struts and braces shown in FIG. 1 are supportively and mutually aligned to the legs in columns 1–6 and rows A–I. With reference to FIG. 1 and FIG. 2 and legs A1, A2 and A3, it can be seen that similarly fashioned 3-way diagonal brace collars 18a, 18b, 18c and 18d, illustrated fully in FIG. 6, align and secure over and about the upper and lower regions of legs A1 and A3, respectively, and that a support plate collar having brace tubes, herein called the brace tubed collared support plate 20a, fully illustrated in FIG. 7, and a 3-way diagonal brace collar 18e align and secure over and about the mid-region of leg A2. Similarly constructed diagonal braces 22a–22d align respectively between the 3-way diagonal brace collars 18a, 18b, 18c, 18d on legs A1 and A3 and the brace tubed collared support plate 20a and 3-way diagonal brace collar 18e on leg A2 to stabilize the legs A1, A2 and A3. Collared support brackets 24a and 24b, fully illustrated in FIG. 5, align over and about the mid-region of the legs A1 and A3 in alignment with the brace tubed collared support plate 20a at the mid-region of the leg A2. Collared support brackets 24a and 24b and brace tubed collared support plate 20a and similar arrangements are used for support of one or more struts as later described in detail. Alternate bracing can also be utilized as shown for legs C1, C2 and C3 incorporating collared support brackets 24c, 24d and 24e and 3-way diagonal brace collars 18f and 18g aligned and secured over and about the upper regions of legs C1, C2 and C3, respectively, 3-way diagonal brace collars 18h and 18i aligned and secured over and about the lower regions of legs C1, and C3, respectively, 3-way diagonal brace collars 18j and 18k aligned and secured over and about the mid-region of leg C2, and diagonal braces 22e–22h installed therebetween, as illustrated.

Support of the legs is also enhanced by horizontal bracing angle bars at the upper region of the legs as required. With reference to legs C1, C2, D1 and D2, bracing at the upper regions is now described. 3-way horizontal brace collars 28a, 28b and 28c, fully illustrated in FIG. 8, align over and about and secure to the upper regions of legs C1, C2, and D1, and a 4-way horizontal brace collar 30a, fully illustrated in FIG. 9, aligns, as illustrated, over and about and secures to the upper region of leg D2. A plurality of angled brace bars including angled brace bars 32a, 32b, 32c and 32d secure and align to the 3-way horizontal brace collars 28a, 28b and 28c and the 4-way horizontal brace collar 30a, as illustrated. Diagonal and horizontal bracing as just now or previously described is incorporated throughout and within for support of the legs in columns 1–6 and rows A–I of the support framework 12 in the stage system 10.

Progressing toward the rear of the support framework 12, a plurality of head assemblies 34a–34n are illustrated fitted to and extending from the tops of the legs starting at leg row F. The head assemblies 34a–34n each includes a head 35, as fully illustrated in FIG. 4. Head assemblies 34a–34n are included at the top of each leg in columns 1–6 and rows A–I, but not all are illustrated for the purpose of brevity and clarity, as is the case for other component members of the invention. Progressing further toward the rear of the support framework 12, a plurality of struts 36a–36n are aligned and secured to the head assemblies 34a–34n. The struts 36a–36n are, for purposes of example and illustration, nominally 36 inches in length and are incorporated to support a plurality of platform panels such as platform panel 14a which is nominally sized as a 36-inch square panel. However, each strut and platform panel may be of any suitable length required. Struts, such as struts 36a–36n, and bracing related members located at the upper region of rows G, H and I form a planar platform elevation at an upper level. Transition to a lower level can also be accomplished by securing of struts such as struts 36f–36j, which could also be a continuous strut, to collared support brackets 24f–24k which align at the same level as head assemblies 34a–34f at the tops of the legs in row F. Further transition to lower platform levels is accomplished incorporating the same method at rows E, C and A. A transition nose member is also provided for transition between levels, as later described in detail.

FIG. 2 illustrates a side view of the support framework, where all numerals correspond to those elements previously described.

Figure 3:
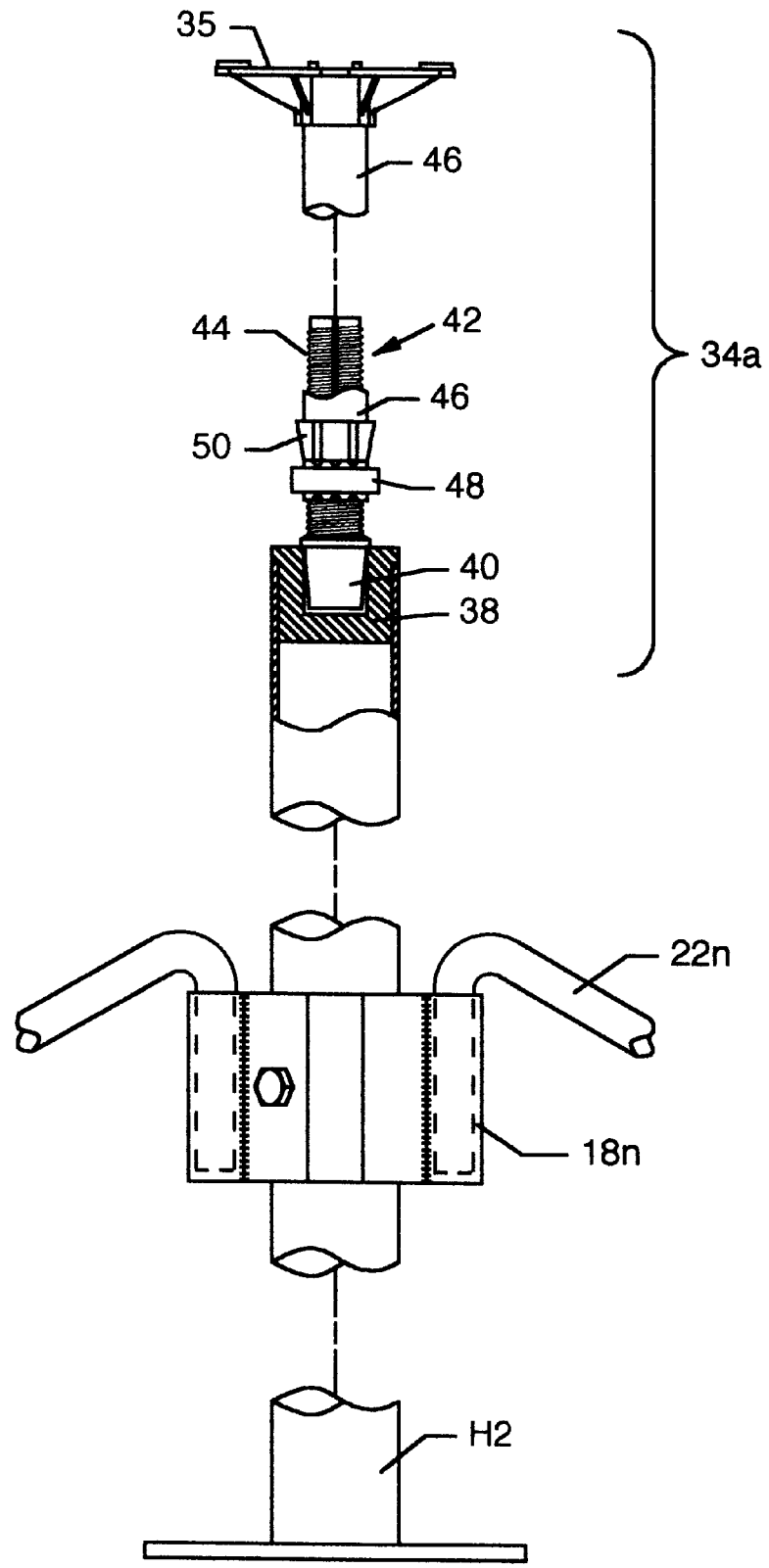
FIG. 3 illustrates a partial cross sectional view of a head assembly aligned and secured to the top of a leg member.

FIG. 3 illustrates partial a cross sectional view of a head assembly 34a aligned and secured to the top of a leg member, such as leg member H2, where all numerals correspond to those elements previously described. A plug 38 secures in the top of the tubular leg H2 for accommodation and frictional engagement of the plain bottom portion 40 of a threaded die cast aluminum stud 42 having threads 44. Aluminum tubing 46 aligns over and about the threaded stud 42 and includes an interlocking vibration proof aluminum adjustment nut 48 connected to the lower end of the tubing 46. The interlocking vibration proof aluminum adjustment nut 48 engages the threads 44 of the threaded stud 42 and is rotated for vertical adjustment of the tubing 46 and the head 35 which is attached to the top of the tubing 46. An aluminum interlocking vibration proof locking collar 50 is located over and about the aluminum tubing 46 to operate in concert with the interlocking vibration proof aluminum adjustment nut 48. One end of diagonal brace 22n is illustrated in engagement with the 3-way diagonal brace collar 18n.

Figure 4:
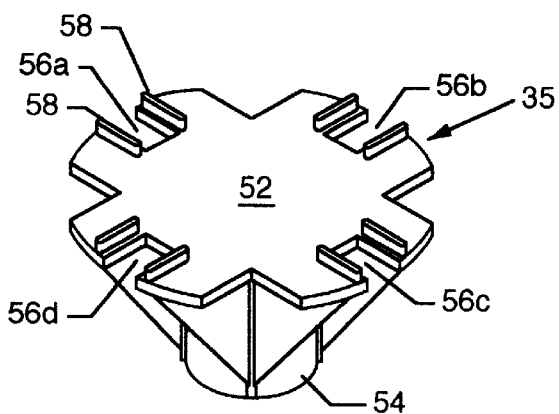
FIG. 4 illustrates an isometric view of a head.

FIG. 4 illustrates an isometric view of the head 35, where all numerals correspond to those elements previously described. The head 35 aligns to the tops of the leg members of rows A–I and columns 1–6, as previously described. The head 35 includes a configured planar member 52 mounted and secured with fillet brace members to an aluminum tube 54 which is appropriately sized to fit over and about the upper portions of the leg members. Slots 56a–56d in the configured planar member 52 align at 90° orientation. A plurality of similarly constructed alignment tabs 58 are adjacent to two sides of each of the slots 56a–56d and extend vertically, as illustrated, to accommodate and align struts 36a–36n on the planar member 52, as illustrated and described later in detail. Slots 56a–56d accommodate strut mounting hardware, as also illustrated and described later in detail.

Figure 5:
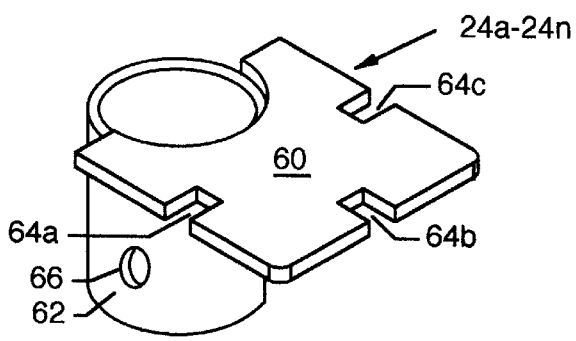
FIG. 5 illustrates an isometric view of a collared support bracket.

FIG. 5 illustrates an isometric view of the collared support brackets 24a–24n, where all numerals correspond to those elements previously described. A configured planar member 60 is secured and mounted at a right angle to a tubular member 62 which is appropriately sized to adjustably align and secure over and about a leg member. Slots 64a–64c in the planar member 60 align at 90° orientation and are utilized to accommodate strut mounting hardware. An illustrated hole 66 and a corresponding opposing hole (not illustrated) through the tubular member 62 accommodate a pin or bolt which secures through a leg member to positionally fix the collared support brackets 24a–24n to a leg member.

Figure 6:
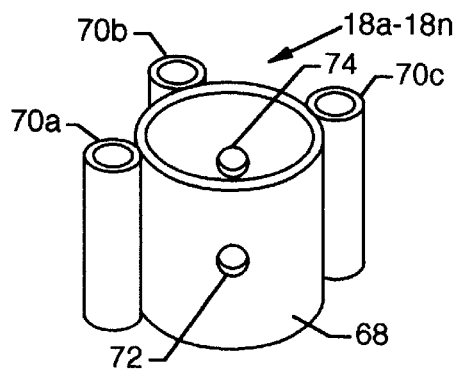
FIG. 6 illustrates an isometric view of a 3-way diagonal brace collar.

FIG. 6 illustrates an isometric view of the 3-way diagonal brace collars 18a–18n, where all numerals correspond to those elements previously described. A tubular member 68, which is appropriately sized to adjustably align and secure over and about a leg member, includes vertically oriented tubing members 70a–70c aligned and secured at 90° orientation, with respect to each other, to the outer circumference of the tubular member 68. The vertically oriented tubing members 70a–70c accommodate the ends of the diagonal braces 22a–22n, such as the end of diagonal brace 22n shown in FIG. 3. A hole 72 and a corresponding opposing hole 74 through the tubular member 68 accommodate a pin or bolt which also secures through a leg member to positionally fix the 3-way diagonal brace collars 18a–18n to a leg member.

Figure 7:
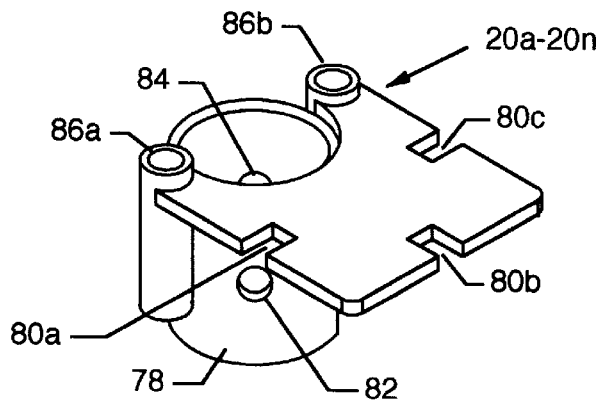
FIG. 7 illustrates an isometric view of a brace tubed collared support plate.

FIG. 7 illustrates an isometric view of the brace tubed collared support plates 20a–20n incorporating features of the collared support brackets 24a–24n and of the 3-way diagonal brace collars 18a–18n, where all numerals correspond to those elements previously described. A configured planar member 76 is secured and mounted at a right angle to a tubular member 78 which is appropriately sized to adjustably align and secure over and about a leg member. Slots 80a–80c in the planar member 76 align at 90° orientation, with respect to each other, and are utilized to accommodate strut mounting hardware. A hole 82 and a corresponding opposing hole 84 through the tubular member 78 accommodate a pin or bolt which also secures through a leg member to positionally fix the brace tubed collared support plates 20a–20n to a leg member. Vertically oriented tubing members 86a and 86b align and secure at 180° orientation, with respect to each other, to the outer circumference of the tubular member 78 and accommodate the ends of the diagonal braces 22a–22n.

Figure 8:
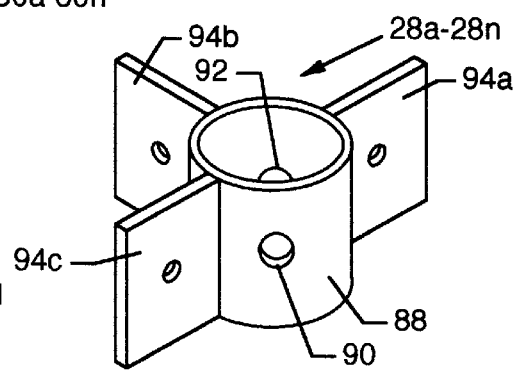
FIG. 8 illustrates an isometric view of a 3-way horizontal brace collar.

FIG. 8 illustrates an isometric view of the 3-way horizontal brace collars 28a–28n incorporated to join angled brace bars 32a–32n together at the upper regions of leg members located at the periphery of the support framework 12, where all numerals correspond to those elements previously described. Included in each of the 3-way horizontal brace collars 28a–28n is a tubular member 88 which is appropriately sized to adjustably align and secure over and about a leg member. A hole 90 and a corresponding opposing hole 92 through the tubular member 88 accommodate a pin or bolt which also secures through a leg member to positionally fix the 3-way horizontal brace collars 28a–28n to a leg member. Vertically oriented planar tabs 94a–94c, each having a mounting hole, align and secure at 90° orientation, with respect to each other, to the outer circumference of the tubular member 88 and mutually secure to the ends of angled brace bars 32a–32n by appropriate hardware.

Figure 9:
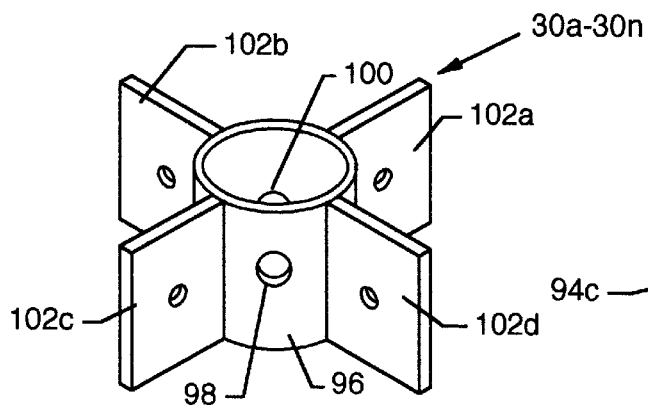
FIG. 9 illustrates an isometric view of a 4-way horizontal brace collar.

FIG. 9 illustrates an isometric view of the 4-way horizontal brace collars 30a–30n incorporated to join angled brace bars 32a–32n together at the upper regions of leg members located distant to the periphery of the support framework 12, where all numerals correspond to those elements previously described. Included in each of the 4-way horizontal brace collars 30a–30n is a tubular member 96 which is appropriately sized to adjustably align and secure over and about a leg member. A hole 98 and a corresponding opposing hole 100 through the tubular member 96 accommodate a pin or bolt which also secures through a leg member to positionally fix the 4-way horizontal brace collars 30a–30n to a leg member. Vertically oriented planar tabs 102a–102d, each having a mounting hole, align and secure at 90° orientation, with respect to each other, to the outer circumference of the tubular member 98 and mutually secure to the ends of angled brace bars 32a–32n by appropriate hardware.

Figure 10:
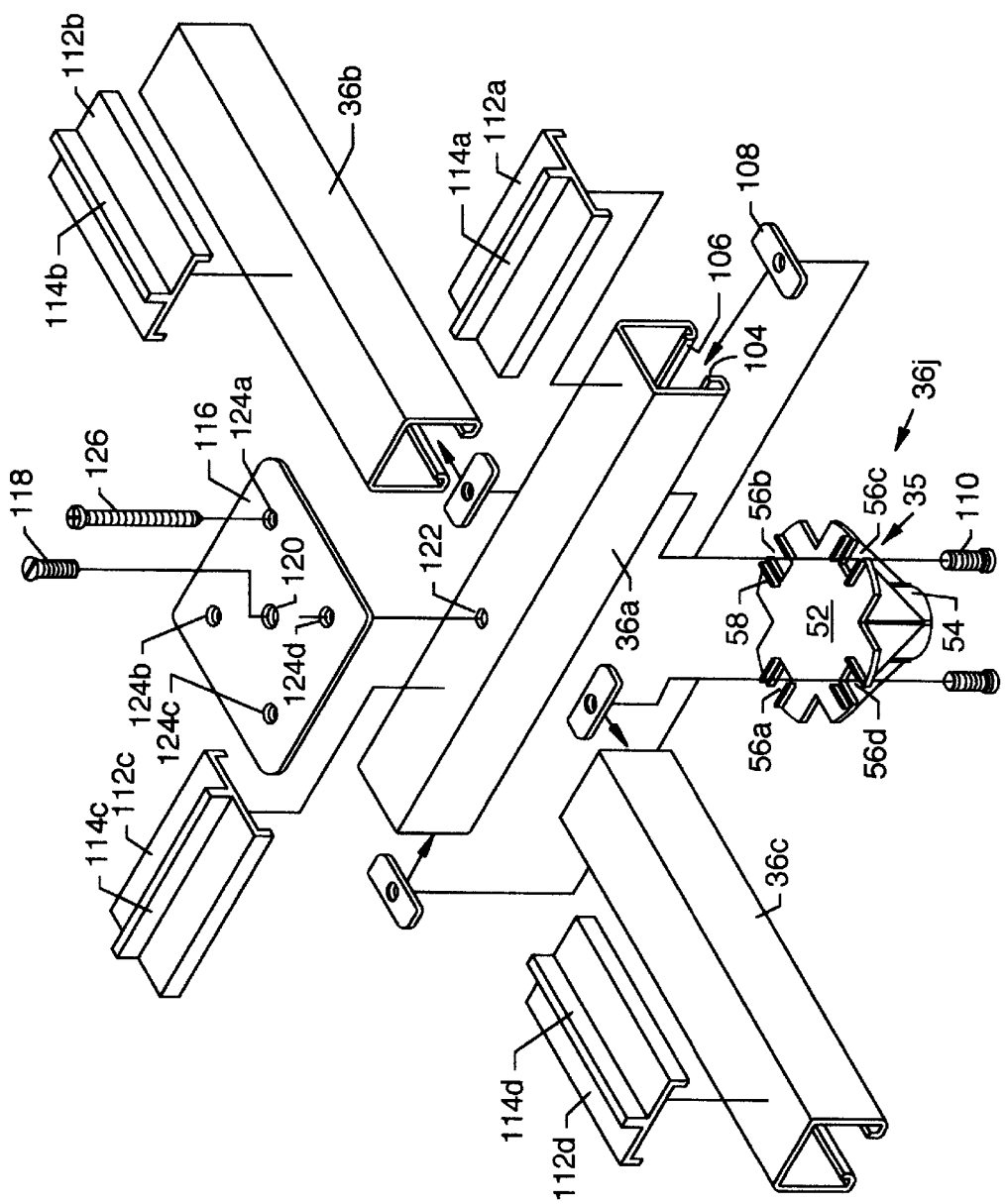
FIG. 10 illustrates an exploded view of the components of the support framework at the upper region of a head assembly.
Figure 11:
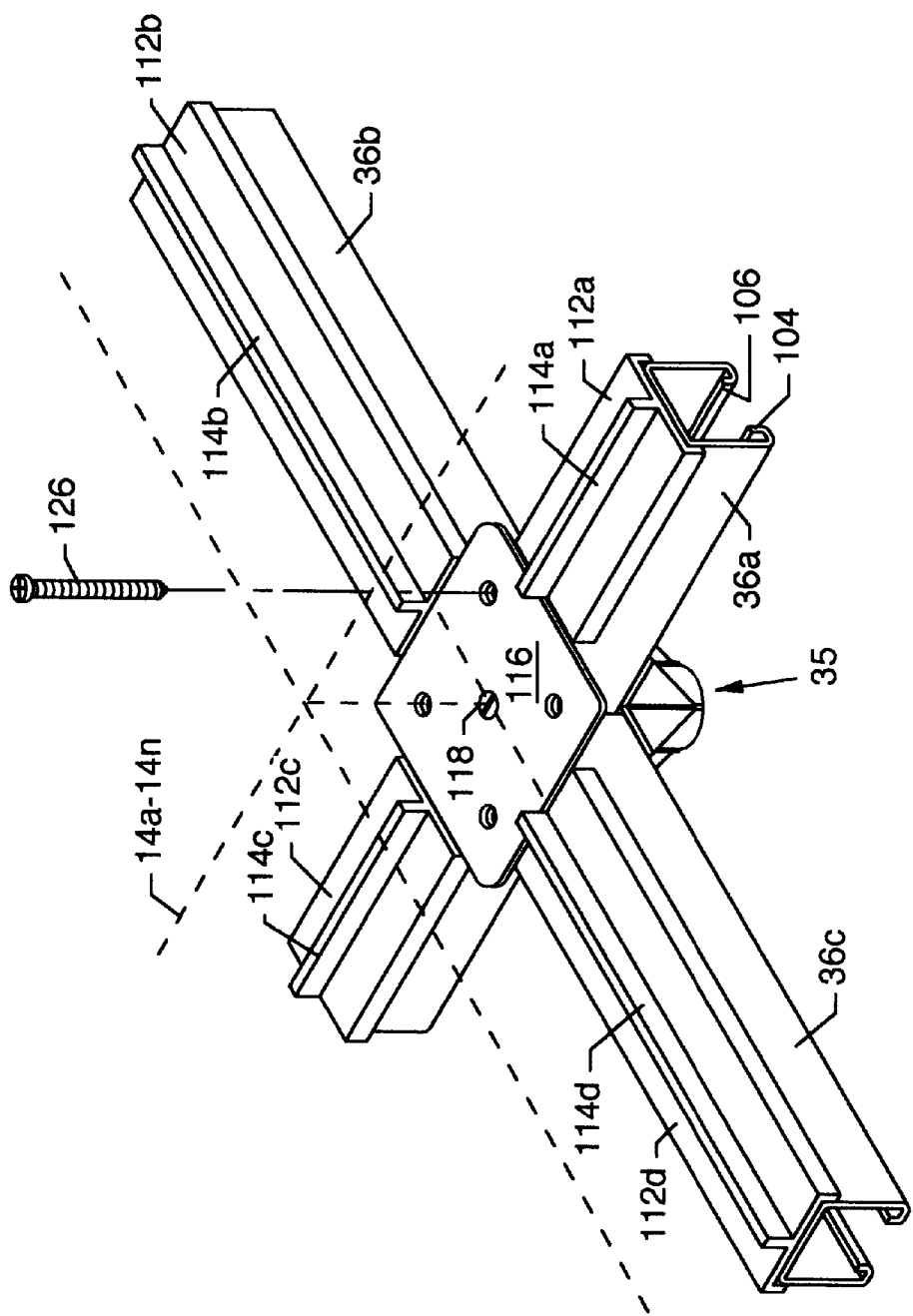
FIG. 11 illustrates an assembled view of the components of the support framework at the upper region of a head assembly.

FIG. 10 illustrates an exploded view of the components of the support framework 12 at the upper region of head assembly 34j, where all numerals correspond to those elements previously described. Struts 36a, 36b and 36c are secured to the surface 52 of the head 35. Strut 36a is shown as the mid-portion of a strut and struts 36b and 36c are one end of each strut. Each strut 36a–36n is in the form of a three sided channel having upturned edges 104 and 106 which align to opposing alignment tabs 58 which are located at the edges of each slot 56a–56d on the head 35. The struts 36a–36c align to the head 35, as illustrated in FIG. 11, whereby the ends of struts 36b and 36c align to strut 36a. A bar nut 108 aligns to the interior of each strut upon the upturned edges 104 and 106. A bolt 110 passes, as illustrated, through the slots, such as slot 56c, to be accommodated by the bar nut 108 and is tightened to secure the strut to the head. Aluminum rib structures 112a–112d are secured over and about the upper surface of each strut 36a–36c and include vertical ribs 114a–114d extending vertically from the rib structures 112a–112d to offer guidance for the edges of the platform panels. A corner lock plate 116 secures, by a screw 118 extending through a hole 120 in the corner lock plate 116, into a threaded hole 122 in the strut 36a. The corner lock plate 116 aligns the ends of the rib structures 112a–112d. Holes 124a–124d are used in conjunction with a plurality of screws 126 to secure a platform panel 14a14n to the support framework 12, as later described in detail.

FIG. 11 illustrates an assembled view of the components of the support framework 12 at the upper region of head assembly 34j, where all numerals correspond to those elements previously described. Illustrated in particular is the spacing of the ends of the rib structures 112a–112b by the corner lock plate 116 and the alignment of the platform panels 14a14n shown in dashed lines.

Figure 12:
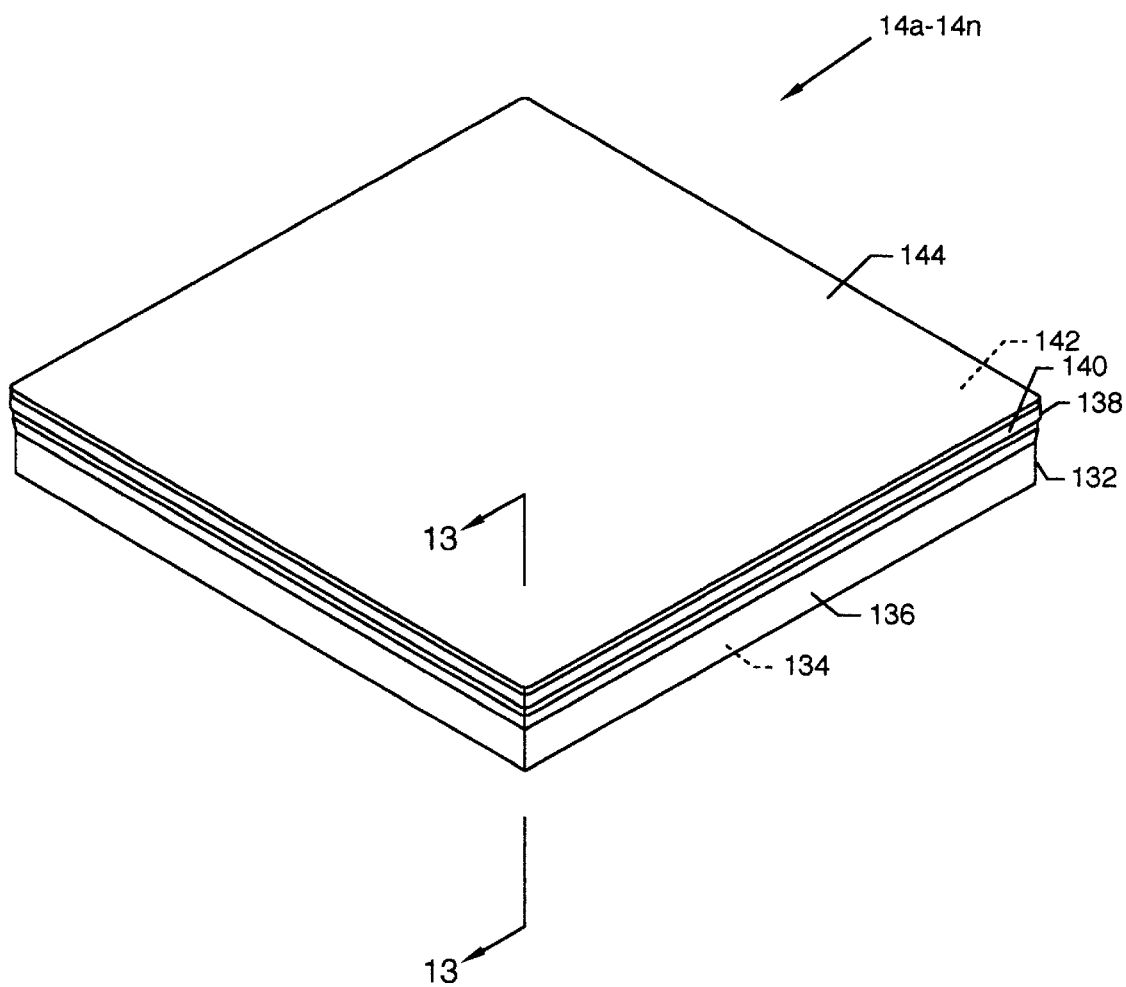
FIG. 12 illustrates an isometric view of a platform panel.
Figure 13:
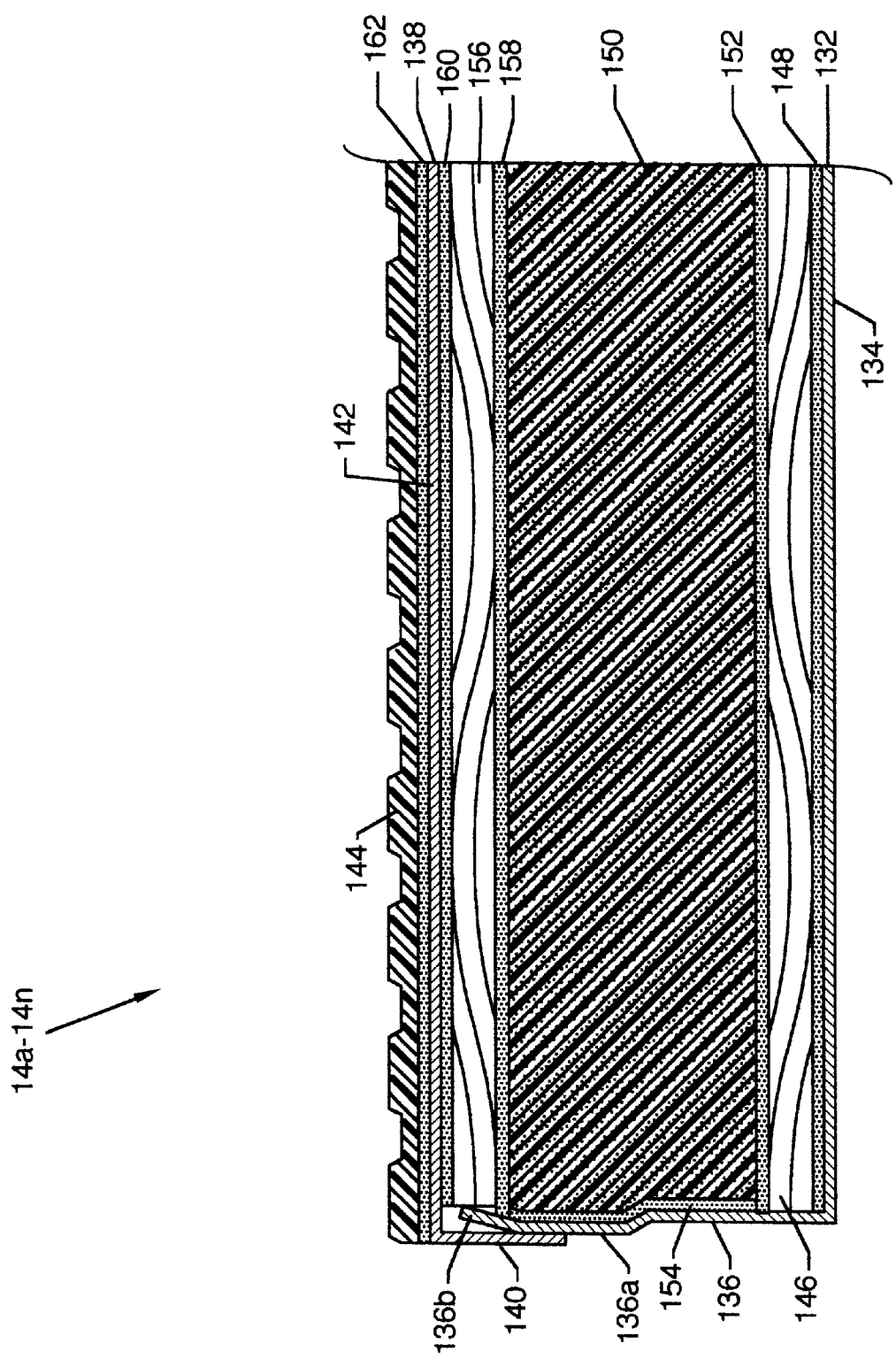
FIG. 13 illustrates a cross sectional view along line 13—13 of FIG. 12.

FIG. 12 illustrates an isometric view of a platform panel 14a14n. The platform panel 14a14n is of a composite structure, the interior of which is illustrated in FIG. 13. The illustrated members of the panel 14a14n include a bottom bonderized steel pan 132 having a planar bottom member 134, also shown in FIG. 13, a continuous vertically aligned edge member 136 about the planar bottom member 134 and extending upwardly therefrom, and a top bonderized planar steel pan 138 having a continuous vertically aligned edge member 140 about a planar top member 142 and extending downwardly therefrom. A planar covering 144, such as plain or geometrically configured rubber, plastic, non-skid material or the like, adheres to the planar top member 142 of the top steel pan 138. The top steel pan 138 is dimensioned to closely fit in sealing engagement over and about the bottom steel pan 132 to contain interior members as illustrated in FIG. 13.

FIG. 13 illustrates a cross sectional view along line 13—13 of FIG. 12, where all numerals correspond to those elements previously described. Composite sandwich members are included in the interior of the platform panel 134 and bonded together and to the bottom steel pan 132 and the top steel pan 138 to provide for overall integral strength and stability. The continuous edge member 136 includes a flared portion 136a and an adjacent angled lip 136b, the latter of which facilitates alignment of the continuous edge member 140 over and about the flared portion 136a of the continuous edge member 136. A lower wooden member 146 aligns to the planar bottom member 134 and is secured thereto by a layer of adhesive 148. High density foam core 150 aligns in the planar bottom member 134 and is secured to the upper surface of the lower wooden member 146 by a layer of adhesive 152. A continuous layer of adhesive 154 secures the vertically aligned continuous edge member 136 to the edge of the high density foam core 150. The lower surface of an upper wooden member 156 secures to the upper surface of the high density foam core 150 by a layer of adhesive 158, and the upper surface of the upper wooden member 156 secures to the lower surface of the planar top member 142 by a layer of adhesive 160. Covering 144 secures to the upper surface of the planar top member 142 by a layer of adhesive 162.

Figure 14:
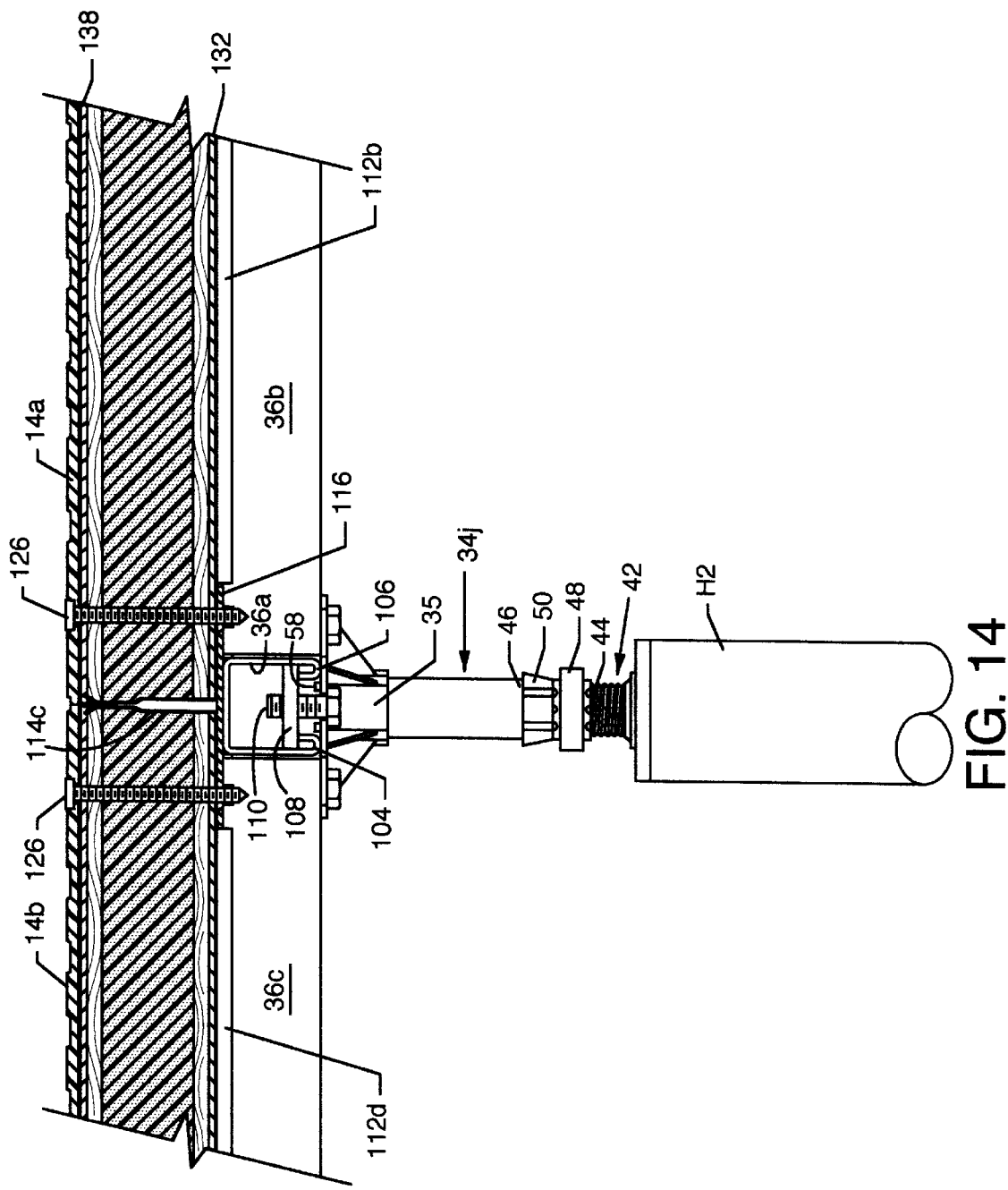
FIG. 14 illustrates a partial cross sectional view illustrating the alignment and securement of components; and, FIG. 15 illustrates a partial cross sectional view of a transition from an upper level to a lower level.

FIG. 14 illustrates a partial cross sectional view illustrating the alignment and securement of components such as, but not limited to, the head assembly 34j, strut members 36a–36c, and platform panels 14a14b, where all numerals correspond to those elements previously described. As shown, the platform panels 14a and 14b are secured in place by the screws 126 passing therethrough and entering the holes in the corner lock plate 116.

Figure 15:
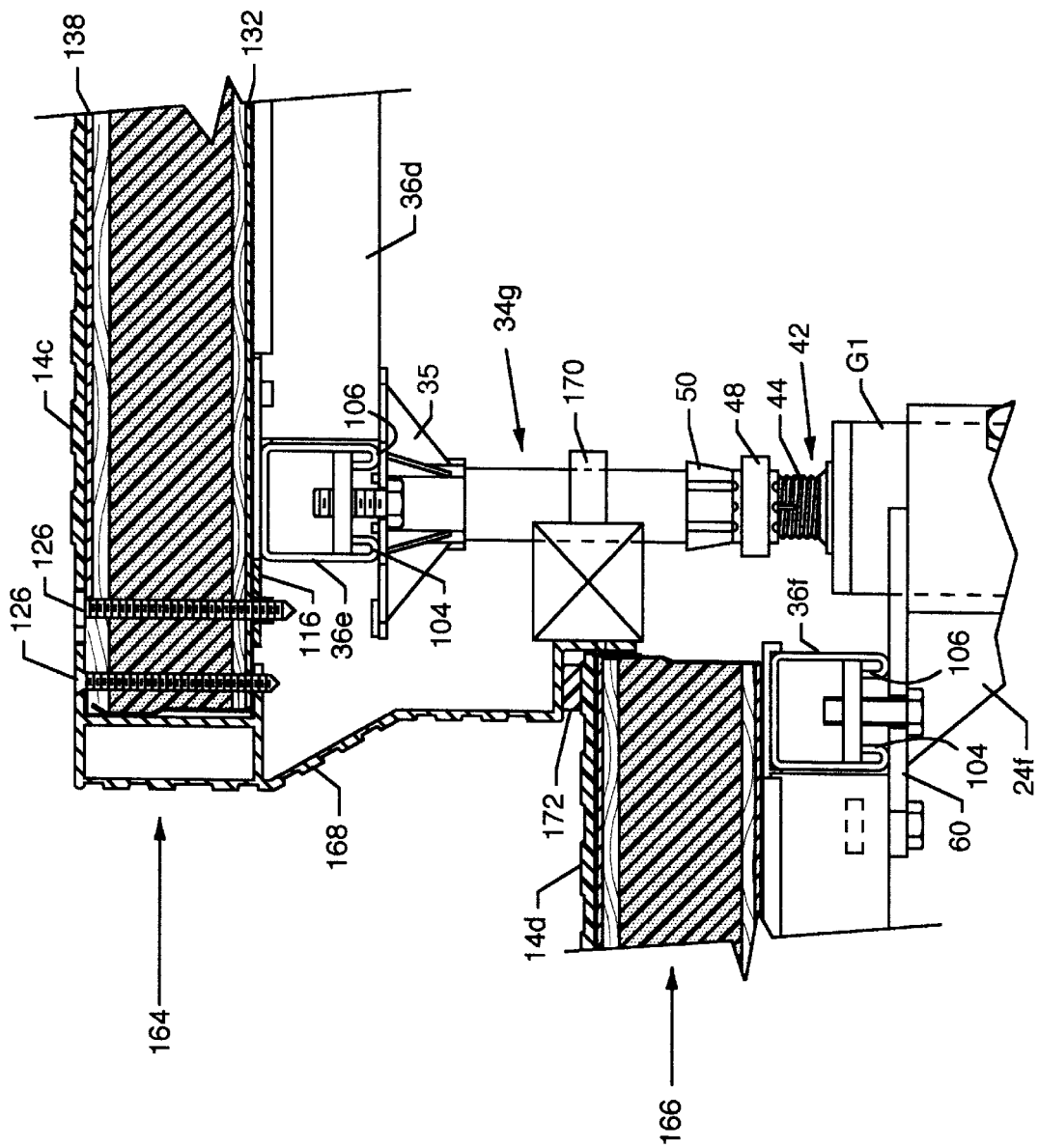

FIG. 15 illustrates a partial cross sectional view of a transition from an upper level, such as the topmost level 164, to a lower level 166, where all numerals correspond to those elements previously described. A collared support bracket 24f secures to leg G1 thereby providing support for strut 36f and other associated struts and components, such as a platform panel 14d at level 166. Extending from and secured to one edge of a platform panel 14c at the upper level 164 is a transition nose member 168 which extends downwardly to meet a support 170 which is secured to the head assembly 34g. A rubber strip 172 is located between the transition nose member 168 and the upper surface of the platform panel 14d. Screws 126 secure platform panel 14c to corner lock plate 116 and transition nose member 168.

Various modifications can be made to the present invention without departing from the apparent scope hereof.

STAGING SYSTEM PARTS LIST

| | |
|---|---|
| 10 | stage system |
| 12 | support framework |
| 14a–n | platform panels |
| 18a–n | 3-way diagonal brace collars |
| 20a–n | brace tubed collared support plates |
| 22a–n | diagonal braces |
| 24a–n | collared support brackets |
| 28a–n | 3-way horizontal brace collars |
| 30a–n | 4-way horizontal brace collars |
| 32a–n | angled brace bars |
| 34a–n | head assemblies |
| 35 | head |
| 36a–n | struts |
| 38 | plug |
| 40 | plane bottom portion |
| 42 | threaded stud |
| 44 | threads |
| 46 | tubing |
| 48 | adjustment nut |
| 50 | locking collar |
| 52 | planar member |
| 54 | tube |
| 56a–d | slots |
| 58 | alignment tab |
| 60 | planar member |
| 62 | tubular member |
| 64a–c | slots |
| 66 | hole |
| 68 | tubular member |
| 70a–c | tubing members |
| 72 | hole |
| 74 | hole |
| 76 | planar member |
| 78 | tubular member |
| 80a–c | slots |
| 82 | hole |
| 84 | hole |
| 86a-b | tubing members |
| 88 | tubular member |
| 90 | hole |
| 92 | hole |
| 94a–c | planar tabs |
| 96 | tubular member |
| 98 | hole |
| 100 | hole |
| 102a–d | planar tabs |
| 104 | upturned edge |
| 106 | upturned edge |
| 108 | bar nut |
| 110 | bolt |
| 112a–d | rib structures |
| 114a–d | ribs |
| 116 | corner lock plate |
| 118 | screw |
| 120 | hole |
| 122 | threaded hole |
| 124a–d | holes |
| 126 | screw |
| 132 | bottom steel pan, bonderized |
| 134 | planar bottom member |
| 136 | edge member, continuous |
| 136a | flared portion |
| 136b | angled lip |
| 138 | top steel pan, bonderized |
| 140 | edge member, continuous |
| 142 | planar top member |
| 144 | covering |
| 146 | lower wooden member |
| 148 | adhesive |
| 150 | high density foam core |
| 152 | adhesive |
| 154 | adhesive |
| 156 | upper wooden member |
| 158 | adhesive |
| 160 | adhesive |
| 162 | adhesive |
| 164 | topmost level |

-continued

| STAGING SYSTEM PARTS LIST | |
|---|---|
| 166 | level |
| 168 | transition nose member |
| 170 | support |
| 172 | rubber strip |

We claim:

1. A platform panel for a stage system comprising, in order:
   a. a covering;
   b. adhesive;
   c. a bonderized top steel pan with a top edge;
   d. adhesive;
   e. an upper wooden member;
   f. adhesive;
   g. high density foam core;
   h. adhesive;
   i. lower wooden member;
   j. adhesive; and,
   k. bonderized bottom steel panel with an edge having a flared portion with an angled lip, wherein said top edge engages over said flared portion and said angled lip is adjacent an edge of said upper wooden member.

* * * * *